Figure 1:
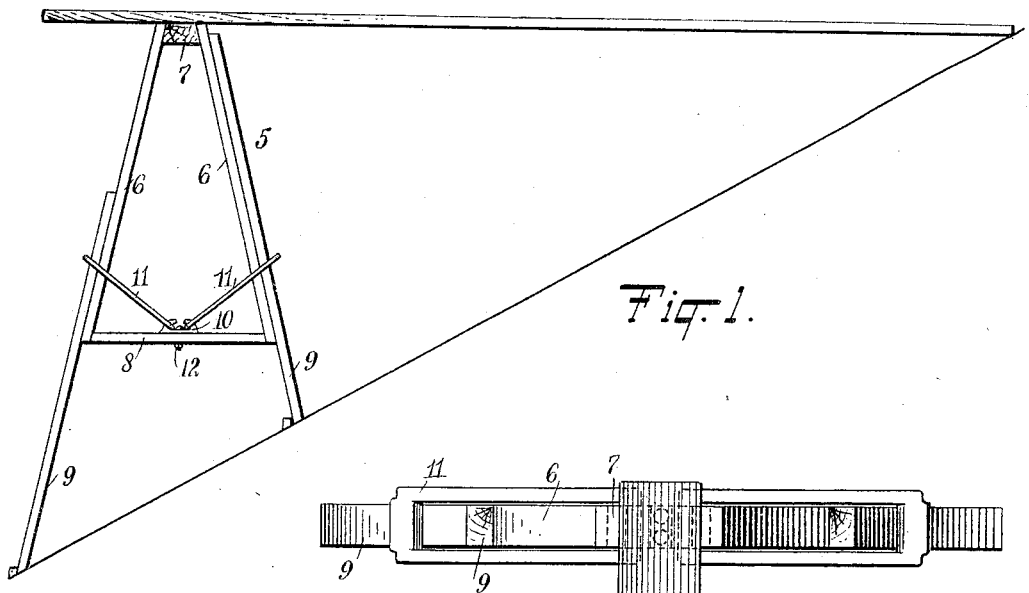

F. P. DOUGLASS.
TRESTLE CLAMP.
APPLICATION FILED NOV. 17, 1910.

993,229.

Patented May 23, 1911.

WITNESSES
George Bambay
L. B. Marshall

INVENTOR
Francis P. Douglass
BY
ATTORNEYS

UNITED STATES PATENT OFFICE.

FRANCIS PRICE DOUGLASS, OF PASADENA, CALIFORNIA.

TRESTLE-CLAMP.

993,229.   Specification of Letters Patent.   Patented May 23, 1911.

Application filed November 17, 1910. Serial No. 592,854.

*To all whom it may concern:*

Be it known that I, FRANCIS P. DOUGLASS, a citizen of the United States, and a resident of Pasadena, in the county of Los Angeles and State of California, have invented a new and Improved Trestle-Clamp, of which the following is a full, clear, and exact description.

My invention relates to trestle clamps and it has for its object to provide one very simple and cheap in construction and operation, and one of great strength; in fact the heavier the load the more firmly does my clamp hold the trestle members together.

Another object of the invention is to provide a trestle clamp which may be exposed to the weather without danger of its efficiency becoming impaired by rust.

Still other objects of the invention will appear in the following specification, in which the preferred form of my invention is disclosed.

In the drawings similar characters of reference indicate corresponding parts in all the views, in which—

Figure 2:
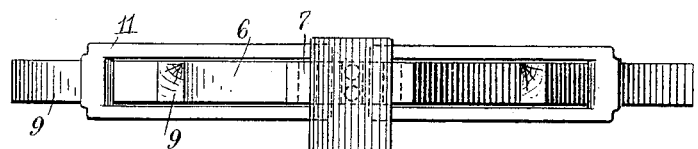
Figure 4:
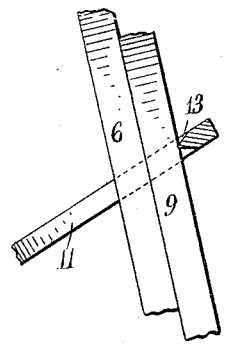
Figure 3:
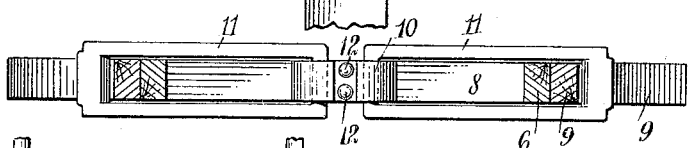
Figure 3:
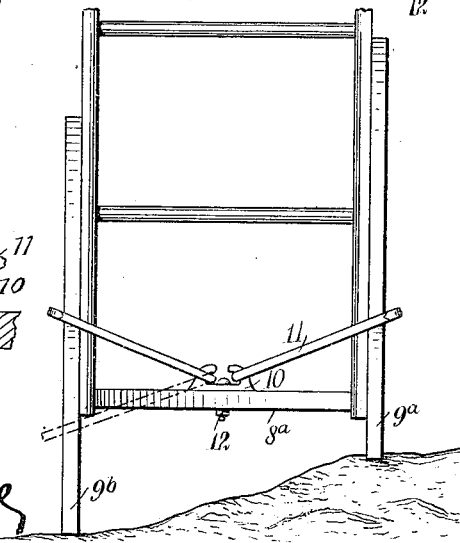
Figure 5:

Figure 1 is a side elevation showing a trestle to which my clamp is applied; Fig. 2 is a plan view partially in section showing two connected trestle members, which are provided with my clamps; Fig. 3 is an elevation showing an extension ladder provided with my clamp; Fig. 4 is a fragmentary view showing how one of the loop members is adapted to engage an outer side of the lower or stationary member of the trestle, and Fig. 5 is an enlarged fragmentary view showing the hook member and the bolt.

By referring to the drawings it will be seen that the trestle 5 has an upper member with sides 6, which are connected at the top by a beam 7, the bottoms of the sides 6 of the upper trestle member being connected by a transverse member 8. The lower trestle member consists of two sides 9. To the transverse member 8 of the upper trestle member there is secured a double hook member 10, loop members 11 being disposed over the hook member 10, one at each side, the loop members 11 being disposed around the sides 9 of the lower trestle member, the said sides 9 being disposed against the outer sides 6 of the upper trestle member. The double hook member 10 is secured to the transverse member 8 by means of bolts 12, which are adjusted in position after the loop members 11 have been attached to the double hook member 10. It is necessary that the loop members be attached to the hook member 10 before the bolts 12 are disposed in the opening in the hook member 10, for after the heads of the bolts have been disposed in the said opening it is no longer possible to free the loop members 11 from the hook member 10, for there is not sufficient space between the head of the bolt 12 and the inner sides of the hook member 10 to permit the loop members 11 to pass out of the opening in the said hook member. As best shown in Fig. 4 of the drawings the inner edges of the outer terminals of the loop members 11 have teeth 13, which are adapted to engage the outer surfaces of the side members 9 of the lower trestle member to prevent the loop members 11 from slipping. To free the side members 9 of the lower trestle member the outer ends of the loop members 11 are forced downwardly by means of a hammer or stick, to the position shown in the dotted lines in Fig. 3, and when this has been done, the side members 9 may be adjusted in position relatively to the sides 6 of the upper trestle member, after which the outer ends of the loop members 11 are again forced upwardly to bind the members in position relatively to each other. As shown in Fig. 1 of the drawings one of the side members 9 may be raised or lowered not only relatively to the upper trestle member, but also with reference to the other side member 9.

In Fig. 3 of the drawings my clamp is shown as applied to an extension ladder, the hook member 10 being secured to a transverse member 8ᵃ of an upper section of the ladder, the loop members 11 being disposed in position in the manner described, the said loop members 11 extending around the outer sides of side members 9ᵃ of a lower section of the ladder.

Having thus described my invention I claim as new and desire to secure by Letters Patent:

1. Two side members spaced apart, an additional member disposed between the two side members, a hook member secured to the said additional member, and two loop members which engage the hook member, one at each side, the loop members being disposed one around each of the side members.

2. Two members having sliding engagement with each other, a hook member having an opening, a loop member disposed in the opening in the hook member, and a bolt by which the hook member is secured to one of the first-two-mentioned members, the head of the bolt closing the opening and preventing the removal of the loop member, the loop member being disposed around the other portion of the first-two-mentioned members.

3. In combination with two members having a sliding engagement with each other, a double hook member, two loop members which are attached to the hook member, one at each side, bolts by which the double hook member is secured to one of the first-two-mentioned members, the heads of the bolts preventing the disengagement of the loop members from the hook member, the loop members being normally disposed around the sides of the other of the first-two-mentioned members.

In testimony whereof I have signed my name to this specification in the presence of two subscribing witnesses.

FRANCIS PRICE DOUGLASS.

Witnesses:
   Don Ferguson,
   Lucius A. Parmele.

Copies of this patent may be obtained for five cents each, by addressing the "Commissioner of Patents, Washington, D. C."